US008918979B2

(12) United States Patent
Baker

(10) Patent No.: US 8,918,979 B2
(45) Date of Patent: Dec. 30, 2014

(54) STATIC AIR DAM

(71) Applicant: Caldwell Manufacturing Company North America, LLC, Rochester, NY (US)

(72) Inventor: Mark R. Baker, Rochester, NY (US)

(73) Assignee: Caldwell Manufacturing Company North America, LLC, Rochester, NY (US)

( * ) Notice: Subject to any disclaimer, the term of this patent is extended or adjusted under 35 U.S.C. 154(b) by 0 days.

(21) Appl. No.: 13/975,721

(22) Filed: Aug. 26, 2013

(65) Prior Publication Data

US 2013/0340349 A1 Dec. 26, 2013

Related U.S. Application Data

(62) Division of application No. 12/888,720, filed on Sep. 23, 2010, now Pat. No. 8,539,642.

(60) Provisional application No. 61/244,989, filed on Sep. 23, 2009.

(51) Int. Cl.

| | |
|---|---|
| ***B23P 11/02*** | (2006.01) |
| ***F24F 13/08*** | (2006.01) |
| ***E06B 7/16*** | (2006.01) |
| *E05D 13/00* | (2006.01) |

(52) U.S. Cl.

CPC ............ *F24F 13/08* (2013.01); *E05D 13/1276* (2013.01); *E06B 7/16* (2013.01)

USPC .................................. 29/450; 49/506; 16/197

(58) Field of Classification Search

USPC ................... 29/428, 469, 449, 450, 525, 230; 16/197, 193, 400, 401, DIG. 16, 214, 16/194; 49/506, 414

See application file for complete search history.

(56) References Cited

U.S. PATENT DOCUMENTS

| | | | | |
|---|---|---|---|---|
| 6,378,169 | B1 * | 4/2002 | Batten et al. | 16/197 |
| 6,622,342 | B1 | 9/2003 | Annes et al. | |
| 6,802,105 | B2 | 10/2004 | Polowinczak et al. | |
| 6,983,513 | B2 | 1/2006 | Pettit | |
| 7,069,621 | B2 | 7/2006 | Malek | |
| 8,819,896 | B2 * | 9/2014 | Kellum et al. | 16/193 |
| 2003/0074764 | A1 | 4/2003 | Pettit et al. | |
| 2004/0163209 | A1 | 8/2004 | Pettit | |
| 2005/0198775 | A1 | 9/2005 | Pettit et al. | |
| 2005/0283944 | A1 | 12/2005 | Wu | |

* cited by examiner

*Primary Examiner* — John C Hong

(74) *Attorney, Agent, or Firm* — Harness, Dickey & Pierce, P.L.C.

(57) ABSTRACT

The static air dam includes at least one mounting feature, which is preferably at least one hole or slot to allow a fastener, such as a screw, bolt, rivet, weld, or other similar attachment devices, to secure the air dam to a wall of a jamb channel. Air passage through the jamb channel is prohibited or at least substantially inhibited by the static air dam that is designed to approximate the size and dimensions of the cross section of the jamb channel. At least one side of the air dam includes a tab or similar structure for securing the free end of the curl spring of a curl spring balance. The air dam includes integrally formed reinforcing elements that either abut or are adjacent to the side walls of the jamb channel. The air dam preferably includes a pair of flexible projections for engaging ears on the curl spring carrier.

10 Claims, 4 Drawing Sheets

STATIC AIR DAM

CROSS-REFERENCE TO RELATED APPLICATIONS

This application is a divisional of U.S. patent application Ser. No. 12/888,720 filed on Sep. 23, 2010; which claims the benefit of U.S. Provisional Application No. 61/244,989, filed on Sep. 23, 2009. The entire disclosures of each of the above applications are incorporated herein by reference.

BACKGROUND

1. Field of the Invention

The invention pertains to the field of window balances. More particularly, the invention pertains to an air dam for a jam channel of a window.

2. Description of Related Art

A window assembly generally includes a window frame, at least one sash, a pair of opposing window jambs, each jamb having a channel for allowing the vertical travel of each sash, and a balance to assist with the raising and lowering of the sash to which it is attached by providing a counterbalance force to the weight of the sash.

The jambs are positioned on either side of the sash within the window frame assembly and typically form vertical jamb channels to provide a space to permit the sash shoe or carrier to traverse up and down as a sash is raised and lowered. The jamb channels are not well sealed at either their top or bottom and each forms, in effect, a "chimney" that permits air to easily flow upwardly, which compromises the insulating value of the window. Further, dust and other fine particles can enter the jamb channel with the air flow, and can ultimately deposit on the balance system, thereby increasing the force necessary to move the carrier through the channel.

In a conventional curl spring carrier, the end of the spring is attached to the wall of the jamb channel via a fastener, as shown, for example, in U.S. Pat. Nos. 5,353,548 and 5,463,793, most commonly a screw, or the spring is attached to an anchor, as shown, for example, in U.S. Pat. No. 6,990,710. As the sash is manually moved to either open or close the window, the curl spring, which may be coiled up within the carrier, either uncoils as the carrier is moved away from the point of attachment or retracts and recoils within the carrier as the carrier is moved toward the point of attachment. The opening of a window depends on the position of the sash. The upper sash opens by being moved downwardly in the jamb channel and the lower sash opens by being moved upwardly along the jamb channel. The point of attachment and whether the curl spring is coiled within the carrier or is uncoiled in the sash's "closed" position varies with window design.

Windows are subjected to manufacturing standards that mandate specific air flow-through standards for each design. For example, there are varying standards which apply depending upon which region of the country the window is scheduled to be installed. To test a window, a blower is sealably attached to the window by a common duct, usually by cutting a hole into the glass or Plexiglas pane of one of the sashes. Pressurized air is then blown through the duct and any leaks are located and recorded. The minimum standard which all windows must pass is a wind speed of 25 miles per hour (mph). Higher wind speeds must be withstood by windows being installed in many parts of the country. For example, a design pressure of 35 (DP 35), which corresponds to a wind speed of about 143 mph, is typically required for non-coastal applications. DP 55, which corresponds to a wind speed of about 180 mph, is a preferred rating for coastal applications, due to higher wind speeds. Not only must the sash panes be able to structurally withstand this high wind speed, but the various moving and interacting elements of each window frame must be built to such tolerances so as to withstand or at least minimize the effects of these wind speed standards.

Numerous attempts have been made to try to meet these aggressive wind speed standards, but they have met with only limited success. For example, even if the window holds up to the pressure generated by the wind, the amount of air passing through the jamb channels via a "chimney effect" may be detrimentally excessive. Attempts to block or alleviate these aerodynamic forces often cause unwanted side-effects, such as adding resistance to the movement of the sash, etc. There is a need in the art for an air block that substantially achieves the goal of minimizing air flow through the jamb channel, which has the ancillary benefit of substantially reducing the amount of airborne particles that accumulates within the jamb channel, while adding a minimal or no resistance to raising and lowering the window sash and the attached window balance carrier or shoe in the jamb channel.

SUMMARY

The static air dam includes at least one mounting feature, which is preferably at least one hole or slot to allow a fastener, such as a screw, bolt, rivet, weld, or other similar attachment devices, to secure the air dam to a wall of a jamb channel. Air passage through the jamb channel is prohibited or at least substantially inhibited by the static air dam that is designed to approximate the size and dimensions of the cross section of the jamb channel. At least one side of the air dam includes a tab or similar structure for securing the free end of the curl spring of a curl spring balance. The air dam includes integrally formed reinforcing elements that either abut or are adjacent to the side walls of the jamb channel. The air dam preferably includes a pair of flexible projections for engaging ears on the curl spring carrier.

DRAWINGS

DETAILED DESCRIPTION

Figure 1:
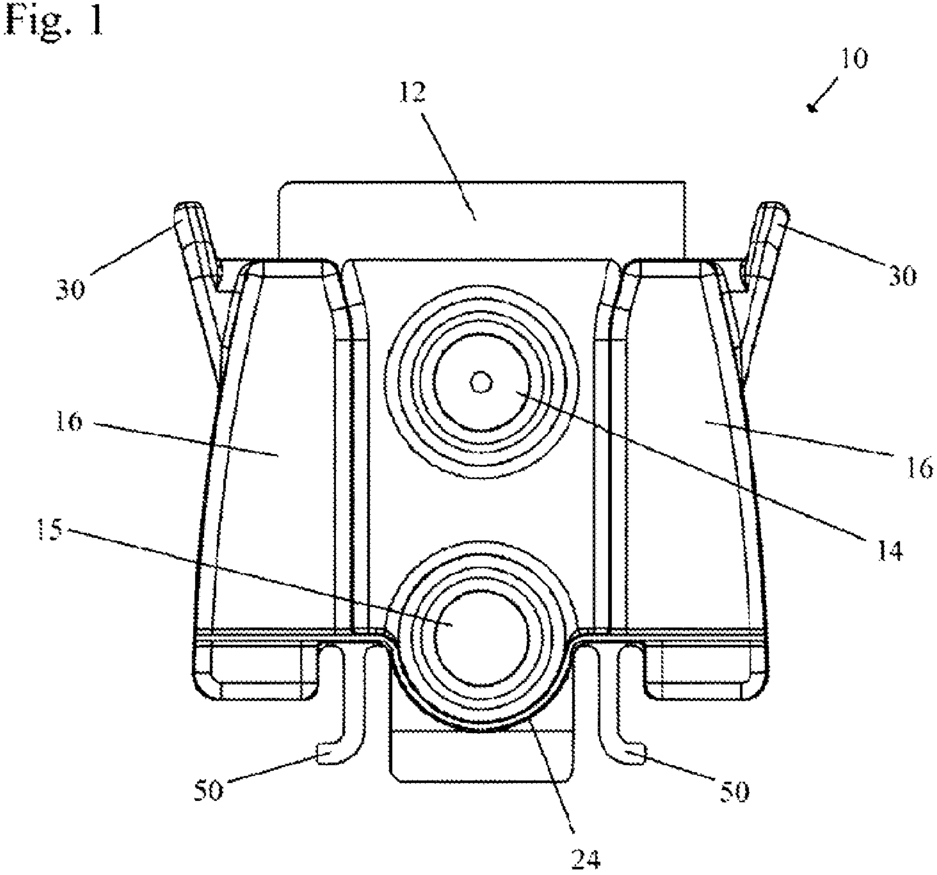
FIG. 1 shows a frontal plan view of a static air dam in an embodiment of the present invention.
Figure 2:
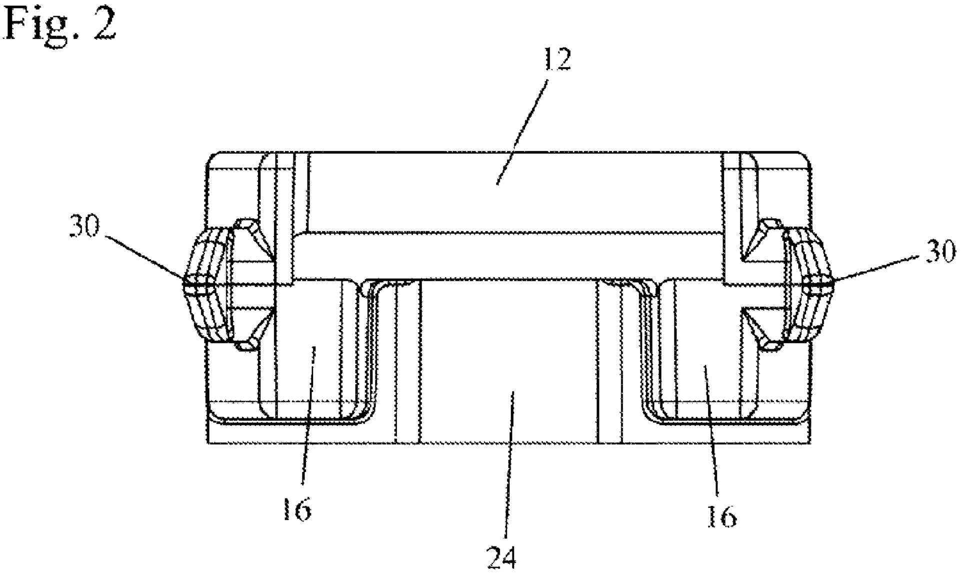
FIG. 2 shows a top plan view of the static air dam of FIG. 1.

A static air dam is preferably securely attached at a specific location in the jamb channel of a window frame. The air dam has at least one mounting feature to secure the air dam to a wall of the jamb channel. The mounting feature is preferably a hole or slot to allow a fastener, such as a screw, bolt, rivet, weld, or other similar attachment devices to secure the air dam to the wall. Alternatively, the mounting feature may be a snap, a clip, or an adhesive element within the spirit of the present invention. The air dam is preferably affixed to the back wall of the jamb channel, but it may alternatively be secured to either one or both of the side walls of the jamb channel.

Air passage through the jamb channel is prohibited or at least substantially inhibited by the static air dam that is designed to have a substantially rectangular footprint approximating the size and dimensions of the cross section of the jamb channel. The air dam includes a tab or similar structure for securing the free end of the curl spring of a curl spring balance. The free end of the curl spring remains stationary with respect to the window frame, while the curl spring balance traverses up and down the jamb channel as the sash of the window assembly is moved up and down.

The air dam includes reinforcing elements that are preferably integrally formed and either abut or are adjacent to the side walls of the jamb channel. These reinforcing elements help to support the tilt latch of the carrier under higher DP standards and impact conditions resulting from the movement of the sash within the jamb channel. An additional benefit provided by the static air dam is the elimination or substantial reduction of airborne particles that might otherwise enter the jamb channel to contaminate the jamb channel itself and the carrier and balance mechanisms within the jamb channel.

FIGS. 1-4 show a static air dam 10 including a support body and two opposing reinforcing elements 16, disposed laterally and perpendicularly to and formed integrally with the support body 12. The reinforcing elements 16 provide structural support in the case of high air/wind pressures or severe impact caused by the rapid and forceful movement of the sash. In this embodiment, the support body 12 includes two holes 14, 15 for insertion of a fastener to securely attach the static air dam 10 to the back wall 20 of the jamb channel 18, although only one hole or slot is sufficient within the spirit of the present invention. In other embodiments, at least one hole or slot may be formed within either one or both of the reinforcing elements 16, thus permitting attachment to either one or both of the side walls 22 of the jamb channel 18.

Figure 3:
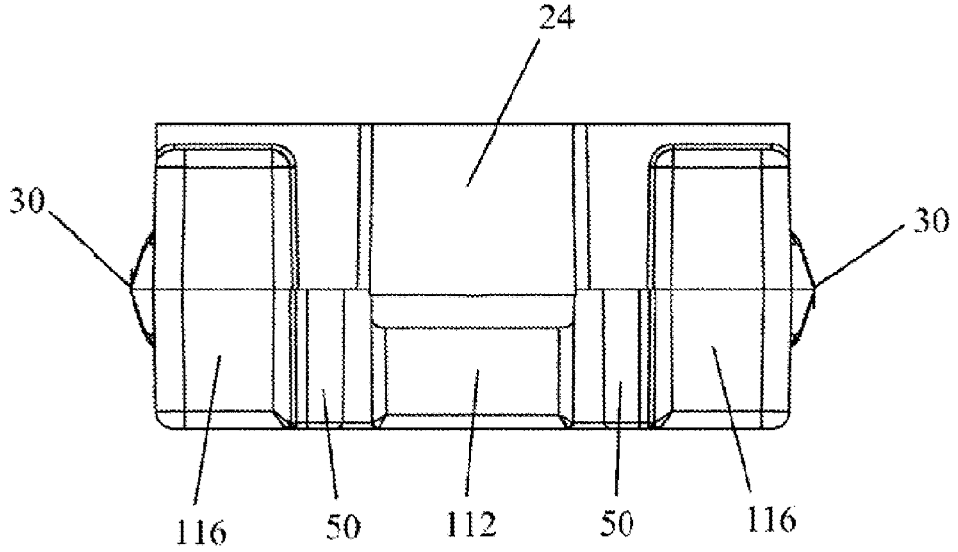
FIG. 3 shows a bottom plan view of the static air dam of FIG. 1.
Figure 4:
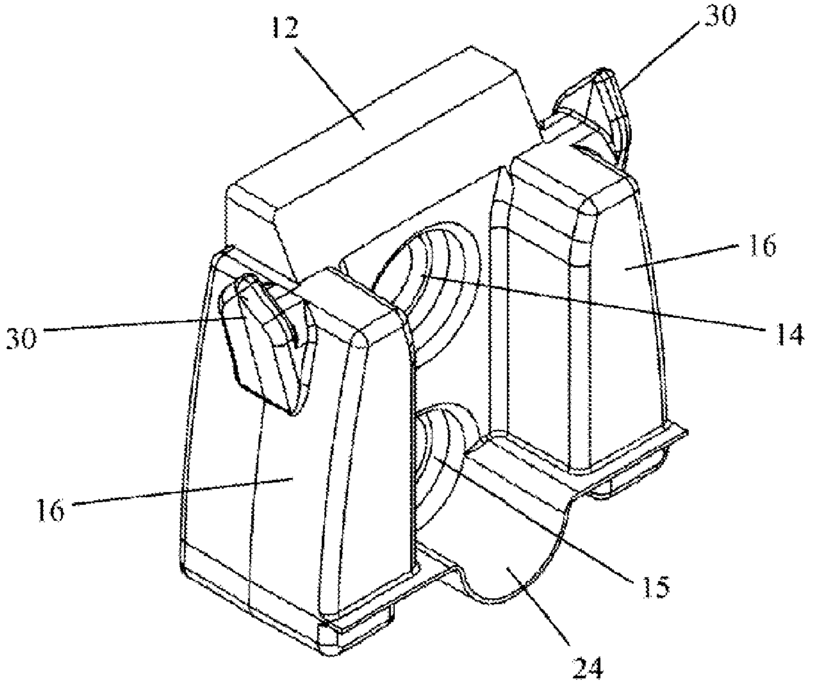
FIG. 4 shows an isometric perspective view of the static air dam of FIG. 1.

A rib member 24, located below the holes 14, 15, spans the space between the reinforcing elements and eliminates or substantially inhibits air and detritus (i.e. dirt, dust, etc.) transmission through the jamb channel. Alternatively, the rib member 24 may be located above or between the holes 14, 15. In the illustrated embodiment, especially visible in FIG. 4, the rib member 24 is slightly bowed to provide greater strength and to avoid interference with the installation of a fastener through one of the holes or slots 14, 15. Although the rib member is preferably bowed, the rib member may have any shape, including a straight shape, or any thickness, which resists air pressure within the spirit of the present invention. As shown in FIG. 3, the overall dimensions of the bottom of the static air dam 10 including the combination of the dimensions of the bottom 112 of the support body 12, the bottom 116 of each of the reinforcing elements 16 and the rib member 24 are designed to approximate the dimensions of the cross section of the jamb channel. Thus, when the sash is installed into the jamb channel, either no or a very minimal amount of air is permitted to flow up or down the jamb channel due to the presence of the static air dam.

Two tabs 30 are integrally formed at the upper ends of each of the lateral reinforcing elements 16. Only one tab is necessary for each static air dam, but the illustrated embodiment has two to permit installation of the static air dam 10 in either the left or right jamb channels of a window frame. The free end of a curl spring is secured to the tab 30.

Flexible projections 50 are integrally formed on either side of the rib member 24 to non-permanently engage a curl spring carrier while mounting the sash to the window jamb. The engagement of the carrier to the static air dam 10 provides stability while installing the sash. The projections 50 are flexible so that the curl spring carrier readily disengages from the static air dam 10 once the end of the curl spring has been secured to the tab 30 of the mounted static air dam 10.

Figure 5:
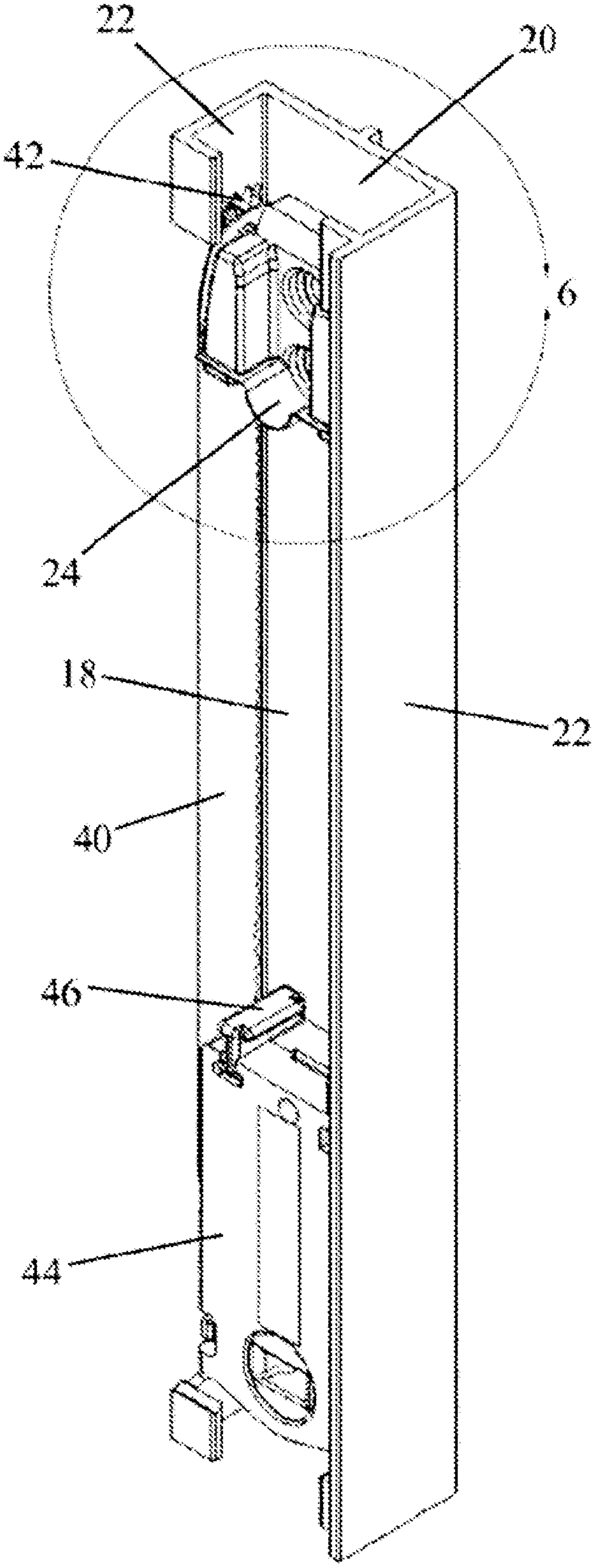
FIG. 5 shows an isometric perspective view of the static air dam of FIG. 1 installed in the jamb channel of a window frame and connected to the free end of a curl spring of a curl spring balance.
Figure 6:
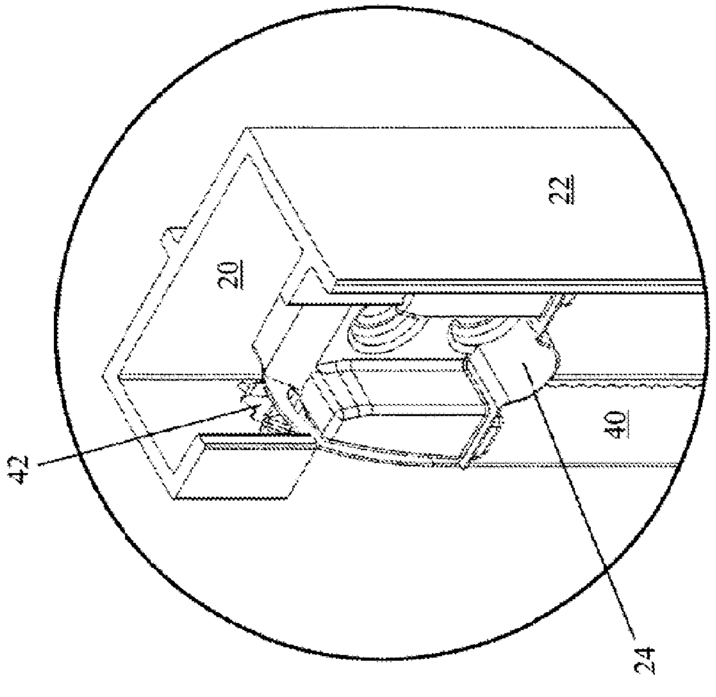
FIG. 6 shows a close up view of the static air dam, designated as detail 6 in FIG. 5.

As shown in FIGS. 5 and 6, the static air dam is mountable within the jamb channel of a window frame and is preferably used with a curl spring balance. A conventional curl spring balance is best shown in FIG. 5 and consists of a curl spring carrier 44 and a curl spring 40. As shown in FIGS. 5 and 6, the free end 42 of the curl spring 40 is secured to the static air dam 10 by placement over the tab 30. The curl spring extends from inside curl spring carrier 44. The tab 30 maintains the free end 42 of the curl spring 40 in place while the curl spring carrier 44 is allowed to travel up and down the jamb channel 18 with the raising and lowering of the attached window sash.

Figure 7:
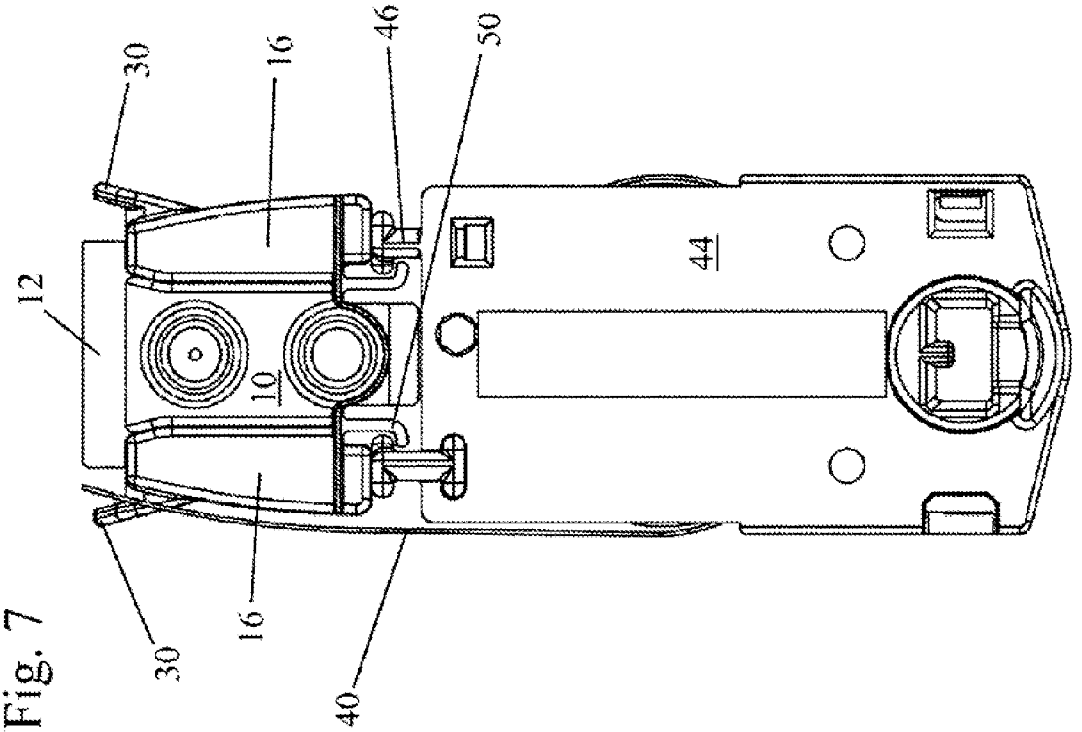
FIG. 7 shows the carrier of a curl spring balance non-permanently engaged with the static air dam of FIG. 1.

As shown in FIG. 7, the flexible projections 50 on the static air dam 10 engage the ears 46 on the top of the curl spring carrier 44 to aid in installation of the static air dam 10 and curl spring balance into the jamb channel 18. Alternatively, the flexible projections may be designed to engage a single ear or one or more holes or recesses on a curl spring carrier. With the free end 42 of the curl spring 40 secured to the tab 30 and the ears 46 of the curl spring carrier 44 engaging the flexible projections 50, the static air dam 10 and curl spring balance may be inserted into the end of the jamb channel 18 as a single unit. The static air dam 10 is then preferably secured to the back wall 20 of the jamb channel 18 by at least one fastener through the at least one hole or slot 14, 15 in the support body 12. A downward force on the curl spring balance releases the ears from the flexible projections 50 so that the curl spring carrier 44 is free to move up and down in the jamb channel 18 with the window sash.

Accordingly, it is to be understood that the embodiments of the invention herein described are merely illustrative of the application of the principles of the invention. Reference herein to details of the illustrated embodiments is not intended to limit the scope of the claims, which themselves recite those features regarded as essential to the invention.

What is claimed is:

1. A method for installing a window sash counterbalance assembly in a jamb channel of a window, the method comprising:

providing a window sash counterbalance system including moveable carrier comprising a spring and an air dam removably attached to the carrier, the air dam comprising at least one upwardly extending tab, at least one downwardly extending flexible projection;

attaching a free end of the spring to the tab;

non-permanently engaging the air dam with the carrier;

inserting the carrier and the air dam into the jamb channel as a single unit; and fixing the air dam to a wall of the jamb channel.

2. The method of claim 1, further comprising:

attaching a window sash to the carrier.

3. The method of claim 2, further comprising:

applying a force against the carrier to disengage the carrier from the air dam.

4. The method of claim 1, wherein non-permanently engaging air dam with the carrier comprises engaging the at least one downwardly extending flexible projection of the air dam with the carrier.

5. The method of claim 4, wherein the carrier further comprises an upwardly extending portion; and wherein engaging the at least one downwardly extending flexible projection of the air dam with the carrier comprises engaging the at least one downwardly extending flexible projection of the air dam with the upwardly extending portion of the carrier.

6. The method of claim 4, wherein the air dam further comprises at least two downwardly extending flexible projections; and wherein engaging the at least one downwardly extending flexible projection of the air dam with the carrier comprises engaging two downwardly extending flexible projections with the carrier.

7. A method for installing a window sash counterbalance assembly in a jamb channel of a window, the method comprising:

providing a carrier having a body including at least one upwardly extending portion and a curl spring having a free end extending from the body;

providing an air dam comprising a support body having at least one mounting feature for attaching the air dam to the jamb channel, a pair of reinforcing elements extending from a side of the support body, a rib member bridging a gap between the reinforcing elements, at least one tab for receiving the free end of the curl spring, and at least one downwardly extending projection;

attaching the free end of the spring to the tab;

non-permanently attaching the air dam with the carrier by way of engaging the at least one downwardly extending projection with the upwardly extending portion;

inserting the carrier and the air dam into the jamb channel as a single unit; and fixing the air dam to a wall of the jamb channel by way of the at least one mounting feature.

8. The method of claim 7, further comprising:

attaching a window sash to the carrier.

9. The method of claim 8, further comprising:

applying a force against the carrier to disengage the carrier from the air dam.

10. A method for installing a window sash counterbalance assembly in a jamb channel of a window, the method comprising:

providing a carrier having a body including two upwardly extending portions and a curl spring having a free end extending from the body;

providing an air dam comprising at least one upwardly extending tab and two downwardly extending flexible projections;

attaching the free end of the spring to the tab;

non-permanently attaching the air dam with the carrier by way of engaging the two downwardly extending projections respectively with the two upwardly extending portions;

inserting the carrier and the air dam into the jamb channel as a single unit; and attaching the air dam to a wall of the jamb channel;

attaching a window sash to the carrier; and applying a force against the carrier to disengage the carrier from the air dam.

* * * * *